(12) United States Patent
Niemenmaa et al.

(10) Patent No.: US 8,938,263 B2
(45) Date of Patent: Jan. 20, 2015

(54) METHOD, APPARATUS AND COMPUTER PROGRAM PRODUCT FOR SELF-LEARNING LOCATION METHOD SELECTION LOGIC

(71) Applicant: Nokia Corporation, Espoo (FI)

(72) Inventors: Jarko Niemenmaa, Espoo (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/889,312

(22) Filed: May 7, 2013

(65) Prior Publication Data

US 2014/0155096 A1 Jun. 5, 2014

Related U.S. Application Data

(63) Continuation of application No. 11/341,026, filed on Jan. 27, 2006, now abandoned.

(51) Int. Cl.
*H04W 24/00* (2009.01)
*H04W 4/02* (2009.01)
*H04W 64/00* (2009.01)
*H04M 1/725* (2006.01)

(52) U.S. Cl.
CPC ............ *H04W 4/02* (2013.01); *H04M 1/72519* (2013.01); *H04W 64/00* (2013.01)
USPC ..................... 455/457; 455/456.1; 455/456.5; 455/550.1

(58) Field of Classification Search
CPC .. H04W 4/02; H04W 64/00; H04L 29/08657; H04M 1/72519
USPC ......................... 455/457, 456.1, 456.5, 550.1
See application file for complete search history.

(56) References Cited

U.S. PATENT DOCUMENTS

| | | | | |
|---|---|---|---|---|
| 6,380,888 | B1 * | 4/2002 | Kucik | 342/357.31 |
| 6,975,873 | B1 * | 12/2005 | Banks et al. | 455/456.5 |
| 7,400,892 | B1 * | 7/2008 | Banks et al. | 455/456.5 |
| 7,764,231 | B1 * | 7/2010 | Karr et al. | 342/457 |
| 7,835,762 | B2 * | 11/2010 | Sendonaris | 455/522 |
| 2003/0069027 | A1 | 4/2003 | Heinonen et al. | |
| 2004/0132464 | A1 | 7/2004 | Poykko et al. | |
| 2005/0255854 | A1 | 11/2005 | Sillasto et al. | |
| 2006/0030337 | A1 * | 2/2006 | Nowak | 455/456.2 |
| 2006/0052115 | A1 * | 3/2006 | Khushu | 455/456.3 |

* cited by examiner

*Primary Examiner* — Danh Le
(74) *Attorney, Agent, or Firm* — Ditthavong & Steiner, PC (57) ABSTRACT

A method, apparatus and computer program product are provided that enable a method for providing location information to be selected based upon a determination, such as a minimization, of the consumption of location server resources that will be consumed by the method. The method, apparatus and computer program product may determine a selected location method from a set of location methods based on predetermined selection criteria. Specifically, the selected location method may be selected to meet a location accuracy requirement specified in a request for location information while consuming a determinable, such as a minimum, amount of resources. The predetermined selection criteria may be updated over time such that method, apparatus and computer program product are self-learning.

29 Claims, 4 Drawing Sheets

METHOD, APPARATUS AND COMPUTER PROGRAM PRODUCT FOR SELF-LEARNING LOCATION METHOD SELECTION LOGIC

This application is a Continuation of copending U.S. application Ser. No. 11/341,026, filed Jan. 27, 2006, herein incorporated by reference in its entirety for all purposes.

BACKGROUND

1. Field of the Invention

Embodiments of the present invention relate generally to mobile terminal technology and, more particularly, relate to a method, apparatus, and computer program product for selecting a method of providing location information associated with a mobile terminal.

2. Background of the Invention

In cellular networks like GSM, WCDMA etc., it is typically possible to determine the geographic location of the mobile terminals, and provide location-based or location-aware services based upon the location of the mobile terminals. Location-based services are those in which the location information of the mobile terminal is a fundamental enabler for offering the services. Examples of these are fleet management/tracking, find-a-friend services, location based games, and navigation services. Location-aware services are services in which available location information of the mobile terminal will enhance the usability of existing services, making them more attractive and easy to use. The location information is not a fundamental enabler for offering these kinds of services. Examples of this category are location based weather forecasts, restaurant finders, and city guides.

In various applications, service announcements can be transmitted to mobile terminals on the basis of a service request of a subscriber in a mobile communication system. Generally, the provision of these chargeable services is most often arranged from outside the actual mobile communication system. By making a call to a required service number or sending a request over the Internet, for example, a mobile subscriber is able to order a selected service announcement to be delivered to the mobile terminal, such as via the display of the mobile terminal. Of these individual services, e.g., weather forecast, traffic announcements, local news and other local services, such as taxi ordering, service station announcements and so on, are services where the mobile subscriber selects the desired announcement on the basis of the geographic area. The mobile subscriber generally wishes to have the service announcement related to his/her current location which varies because of the mobile nature of the mobile subscriber.

Numerous means of obtaining information about a current location of a mobile terminal are becoming more widely available for use on mobile terminals. Examples of such means include cell identity location (cell ID), Uplink Time Difference Of Arrival (U-TDOA), Global Positioning System (GPS), Assisted-GPS, etc. However, each means of obtaining location information has a different level of accuracy. For example, Assisted-GPS is currently able to offer location accuracy of about 10 m to 100 m. Meanwhile, cell ID is typically accurate to within only about 200 m to several kilometers. Furthermore, cell ID accuracy may vary significantly between different cells. Each of the different means of obtaining location information also uses a corresponding different amount of resources to obtain location information. For example, computing capacity of a location server, communication bandwidth and time consumption are all resources which are utilized at varying degrees by each of the means of obtaining location information.

Currently, a location server network element (such as a secure user plane location platform (SLP) with an open mobile alliance (OMA) standardized Secure User Plane Location (SUPL) framework, or a Serving Mobile Location Center (SMLC) with 3GPP standardized location solution for GSM/WCDMA) determines which method to use for obtaining location information in response to a location request based on accuracy and response time requirements included in the location request. However, this may result in an iterative process that consumes relatively large amounts of the location server's resources. More specifically, if a location request specifies a quality of service (QoS) requirement for accuracy, the location server will obtain location information using a first method that typically consumes least resources. If the first method produces location information that fails to meet accuracy requirements, then a second method will be used to obtain location information. Typically this second method is expected to provide better location accuracy, but it usually also consumes more resources. This process may continue until the QoS requirement is met, thereby consuming large amounts of resources of the location server. Accordingly, there is a need for a means by which a method for providing location information may be selected which minimizes or at least reduces the consumption of location server resources, but which still guarantees that the requested location accuracy can be met.

BRIEF SUMMARY OF THE INVENTION

A method, apparatus and computer program product are therefore provided that enable a method for providing location information to be selected based upon a determination, such as a minimization, of the consumption of location server resources that will be consumed by the method. According to an exemplary embodiment, a method, apparatus and computer program product are provided which determine a selected location method from a set of location methods based on predetermined selection criteria. Specifically, the selected location method may be selected to meet a location accuracy requirement specified in a request for location information while consuming a determinable, such as a minimum, amount of resources. The predetermined selection criteria may be updated over time such that method, apparatus and computer program product are self-learning.

In one exemplary embodiment, a method of self-learning location method selection is provided that selects a location method for determining location information of a mobile terminal by determining a selected location method from a set of location methods based on predetermined selection criteria, communicating the selected location method to a position determining entity, and updating the predetermined selection criteria responsive to information received from the position determining entity.

Prior to determining the selected location method, a request for location information may be received that includes a requested location accuracy or with which a requested location accuracy can be associated. Based on the request, the set of location methods may be determined that have an expected accuracy at least equal to the requested location accuracy.

According to one embodiment, the predetermined selection criteria includes an expected accuracy and a resource consumption. As such, the determination of the selected location method may include selecting a location method that has an expected accuracy at least equal to the requested location accuracy and a resource consumption that meets a predefined resource usage criteria, such as by consuming the minimum amount of resources among those location methods that have the requested location accuracy.

In order to facilitate the self-learning aspect, the selection criteria may be updated by updating the expected accuracy based on accuracy information associated with the selected location method. In addition, the selection criteria may be updated by updating the resource consumption associated with the selected location method.

In another exemplary embodiment, a computer program product for self-learning location method selection is provided. The computer program product includes at least one computer-readable storage medium having computer-readable program code portions stored therein. The computer-readable program code portions include a first executable portion for determining a selected location method from a set of location methods based on predetermined selection criteria, a second executable portion for communicating the selected location method to a position determining entity, and a third executable portion for updating the predetermined selection criteria responsive to information received from the position determining entity.

The computer program product can also include a fourth executable portion for an initial operation of receiving a request for location information. The request can include a requested location accuracy. Based on the request, the computer program product can also include a fifth executable portion for determining the set of location methods from a plurality of location methods with the set of location methods including location methods having an expected accuracy at least equal to the requested location accuracy.

The predetermined selection criteria can include an expected accuracy and a resource consumption. As such, the first executable portion can include instructions for selecting the location method to have an expected accuracy at least equal to the requested location accuracy and a resource consumption that meets a predefined resource usage criteria, such as by consuming the minimum amount of resources among those location methods that have the requested location accuracy.

The third executable portion can include instructions for updating the expected accuracy based on accuracy information associated with the selected location method. Likewise, the third executable portion can include instructions for updating the resource consumption associated with the selected location method.

In another exemplary embodiment, an apparatus for self-learning location method selection is provided. The apparatus includes a statistical database, a resource consumption table, and a location method selection module that is configured to determine a selected location method from a set of location methods based on predetermined selection criteria, communicate the selected location method to a position determining entity, and update the predetermined selection criteria responsive to information received from the position determining entity. The apparatus may be, for example, a location server in a wireless communication network and the position determining entity may be co-located with the location server.

The location method selection module may be further configured to receive a request for location information that includes a requested location accuracy. As such, the location method selection module may be further configured to determine the set of location methods from a plurality of location methods with the set of location methods including location methods having an expected accuracy at least equal to the requested location accuracy. In this regard, the statistical database includes a list of each of the plurality of location methods and the expected accuracy associated with the each of the plurality of location methods.

The statistical database can include a list of each of the plurality of location methods and an expected accuracy associated with the each of the plurality of location methods. In addition, the resource consumption table can include the list of each of the plurality of location methods and a resource consumption associated with the each of the plurality of location methods. In this embodiment, the predetermined selection criteria can include the expected accuracy and the resource consumption such that the selected location method is determined by selection of one of the set of location methods having the expected accuracy at least equal to a requested location accuracy and a resource consumption that meets a predefined resource usage criteria.

The location method selection module can be advantageously configured to update the predetermined selection criteria by updating the expected accuracy based on accuracy information associated with the selected location method. Likewise, the location method selection module can update of the predetermined selection criteria by updating the resource consumption associated with the selected location method.

Embodiments of the invention provide a method, apparatus and computer program product for self-learning location method selection. As a result, location information may be obtained having sufficient accuracy while using a determinable, such as a minimum, amount of resources.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

An embodiment of the invention may be embodied in the form of computer implemented processes and apparatuses for practicing those processes. The present invention may also be embodied in the form of computer program product containing instructions stored in tangible media, such as floppy diskettes, CD-ROMs, hard drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to select one of a plurality of location methods such that a desired accuracy is achieved while a determinable, such as a minimum, amount of resources are used by the selected location method.

Figure 1:
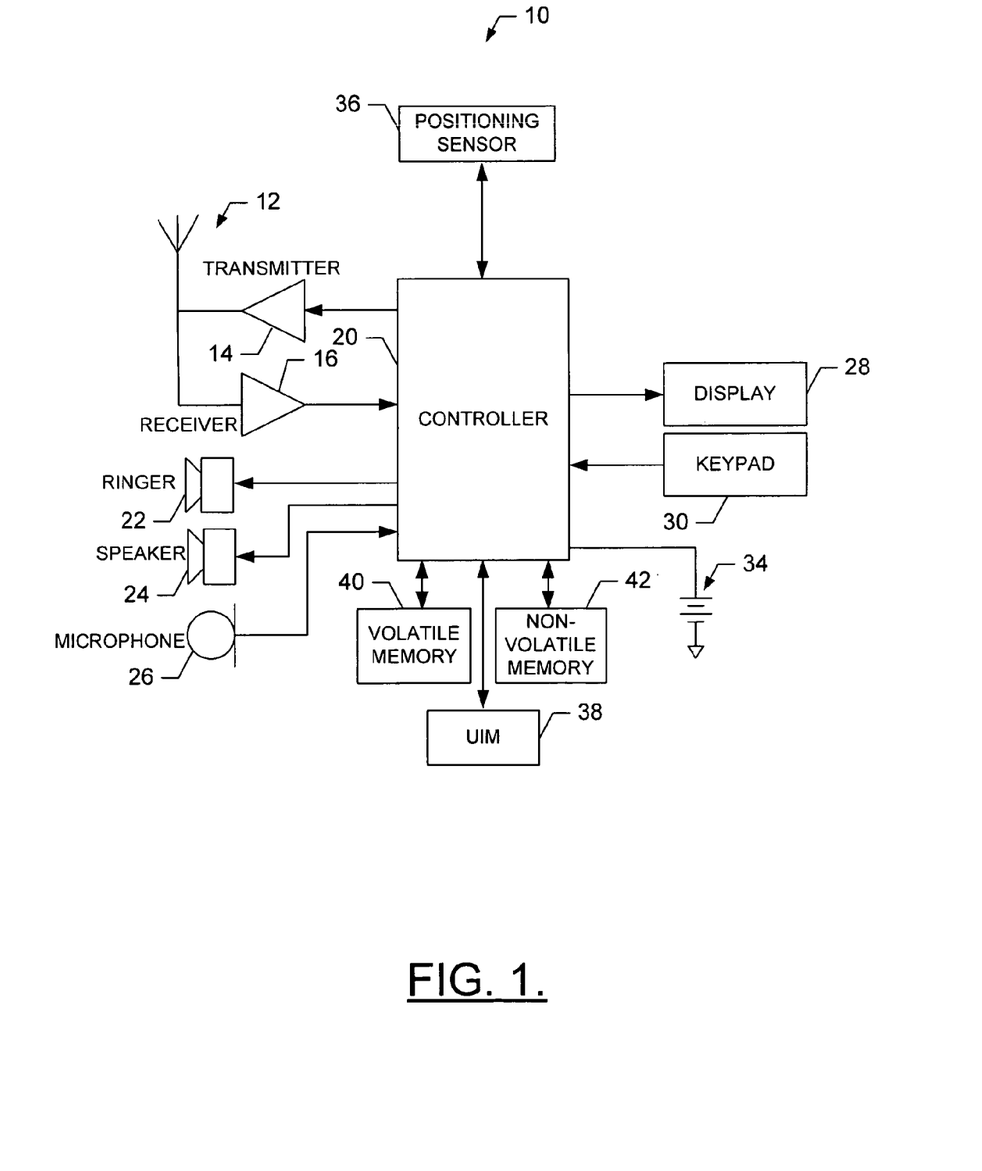
FIG. 1 is a schematic block diagram of a mobile terminal according to an exemplary embodiment of the present invention.

FIG. 1 illustrates a block diagram of a mobile terminal 10 that could embody and would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile television, laptop computers and other types of voice and text communications systems, can readily employ the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 22, a ringer 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output. In addition, the mobile terminal 10 may include a positioning sensor 36. The positioning sensor 36 may include, for example, a global positioning system (GPS) sensor, an assisted global positioning system (Assisted-GPS) sensor, etc. In this regard, the positioning sensor 36 is capable of determining a location of the mobile terminal 10, such as, for example, the longitudinal and latitudinal coordinates of the current location of the mobile terminal 10.

The mobile terminal 10 may be equipped with or otherwise be adapted to receive a UIM 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
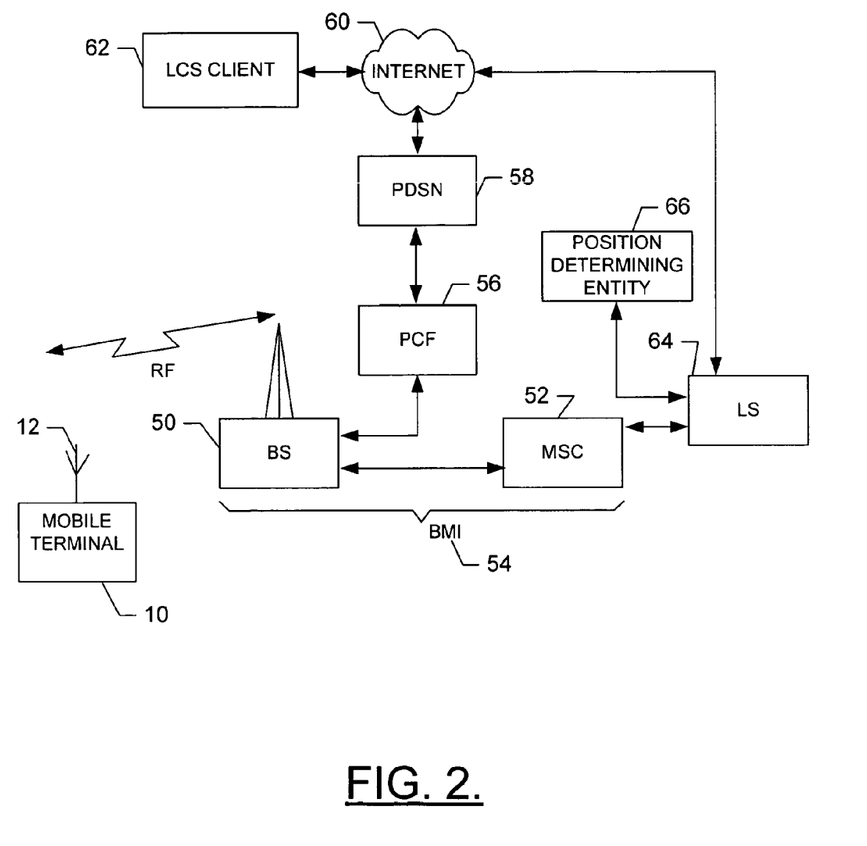
FIG. 2 is a schematic block diagram of a wireless communications system according to an exemplary embodiment of the present invention.

Referring now to FIG. 2, an illustration of one type of wireless communications network including a terminal, such as the mobile terminal 10, which would benefit from embodiments of the present invention is provided. As shown, the mobile terminal 10 includes the antenna 12 for transmitting signals to and for receiving signals from a base site or base station (BS) 50. The BS 50 is a part of a cellular network that includes a mobile switching center (MSC) 52, voice coder/decoders (vocoders), data modems, and other units required to operate the cellular network. The MSC 52 is capable of routing calls and messages to and from the mobile terminal 10 when the mobile terminal 10 is making and receiving calls. The cellular network may also be referred to as a Base Station/MSC/Interworking function (BMI) 54. The MSC 52 controls the forwarding of messages to and from the mobile terminal 10 when the mobile terminal 10 is registered with the cellular network, and also controls the forwarding of messages for the mobile terminal 10 to and from a message center (not shown). Such messages may include, for example, voice messages received by the MSC 52 from users of Public Switched Telephone Network (PSTN) telephones, and may also include Short Message Service (SMS) messages and voice messages received by the MSC 52 from the mobile terminal 10 or other mobile terminals serviced by the cellular network.

The mobile terminal 10 can also be coupled to a data network. For example, the BS 50 can be connected to a packet control function (PCF) 56, which is in communication with a Packet Data Serving Node (PDSN) 58. The PDSN 58 may be connected to a wide area network, such as the Internet 60. In turn, devices such as processing elements (e.g., personal computers, server computers or the like) can be coupled to the mobile terminal 10 via the PDSN 58. For example, the processing elements can include one or more processing elements associated with a location services (LCS) client 62. By directly or indirectly connecting both the mobile terminal 10 and the other devices to the PDSN 58 and the Internet 60, the mobile terminal 10 can communicate with the other devices, such as according to the Internet Protocol (IP) specification, to thereby carry out various functions of the mobile terminal 10.

The MSC 52 is coupled to a location server (LS) 64 providing location services for different applications or LCS clients 62 (only one client shown for clarity). In general terms, the LS 64 can be defined as an entity capable of providing information concerning a geographical location of the mobile terminal 10. In this regard, the LS 64 may be coupled to a position determining entity 66 capable of determining the geographic location of the mobile terminal 10 and providing the location information to the LS 64 in response to a request by the LS 64. The positioning sensor 36 (if applicable) may be employed by the position determining entity 66 to determine the geographical location. The geographical location may be defined on the basis of the position of the mobile terminal 10 relative to the base station 50 of the wireless communications network.

The geographical location of the base station 50 and/or the mobile terminal 10 may also be defined, for example, in X and Y coordinates or in latitudes and longitudes. The geographical location may also be defined in other manners. For example, the geographical location may alternatively be defined in a spherical coordinate system utilizing defined radiuses and angles. In addition to a geographical location in an X-Y plane, the location of the base stations and/or mobile terminals may also be defined in a vertical direction. For example, a Z coordinate may be used when providing the location information in the vertical direction. The vertical location may be advantageous in some situations such as to define the location in mountainous environments or in cities with tall buildings.

The LS 64 can comprise any of a number of known elements in the wireless communications network such as, for example, a gateway mobile location center (GMLC), as defined by the GSM specification. The LS 64 is typically arranged to receive a request for location information, such as from an LCS client 62. If the LCS client 62 is authorized to receive the location information, then, the LS 64 can initiate determining the location of the mobile terminal 10, such as by employing the position determining entity 66. In this regard, in response to an initiation signal from the LS 64, the position determining entity 66 is adapted to collect information concerning the location of the mobile terminal 10. The position determining entity 66 is also adapted to process the information, if necessary, in order to determine the geographical location of the mobile terminal 10. The position determining entity 66 may then communicate the geographical location of the mobile terminal 10 to the LS 64 as location information.

It should be noted that the position determining entity 66 and the LS 64 may be co-located, for example, in a single server. It should also be appreciated that location information obtained by the LS 64 and provided to the LCS client 62 is location information that is typically provided in response to user authorized requests initiated via the LCS client 62. The user authorized requests typically include a specification for quality of service (QoS). Alternatively there can be a QoS specification that is associated with a location information request from a particular LCS client (e.g. the LS has a database where default QoS values for each LCS client are stored for the cases when the actual location information request from the LCS client does not contain QoS). The QoS may include an accuracy requirement or, more specifically, a location accuracy requirement. In other words, the LCS client 62 may request location information regarding the location of the mobile terminal 10 and the request from the LCS client 62 will often specify the accuracy desired for the location information.

Figure 3:
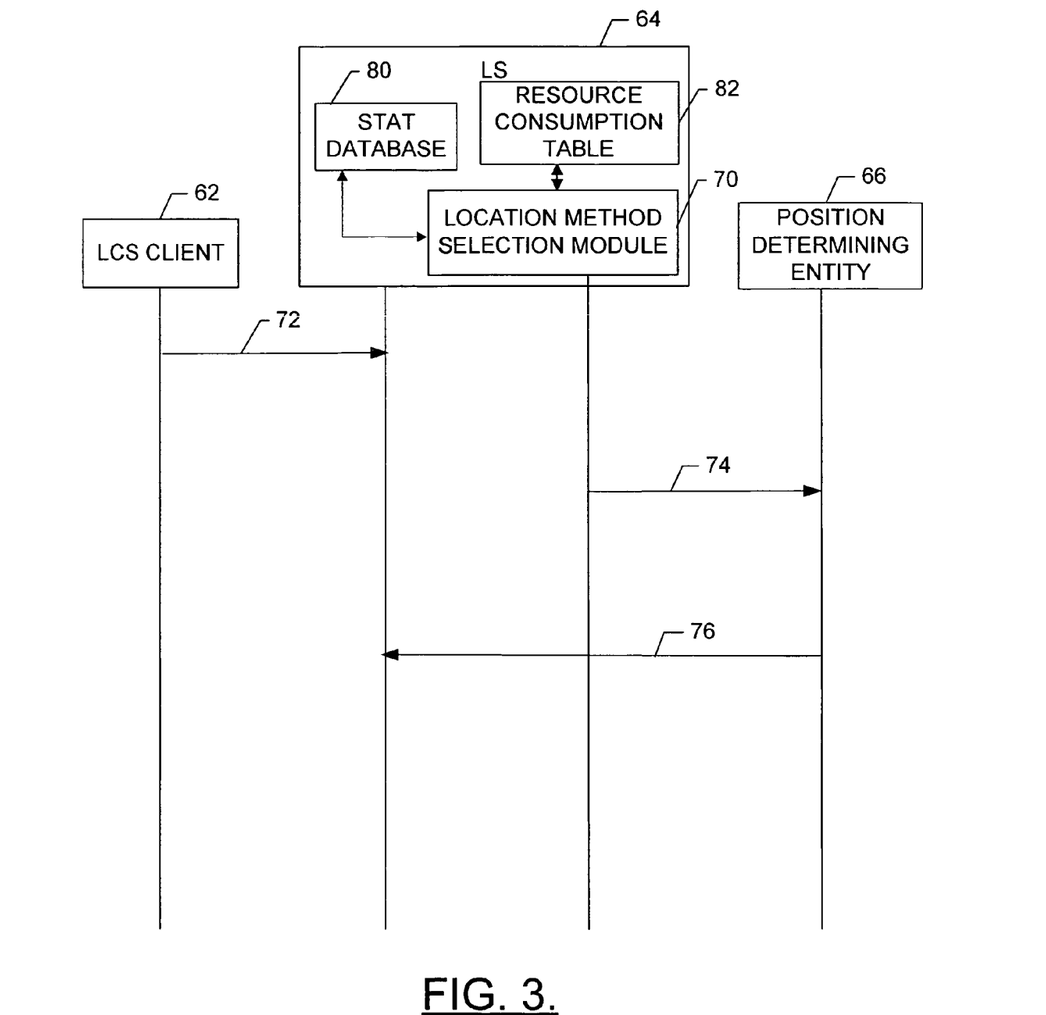
FIG. 3 illustrates a control flow diagram of a method for self-learning location method selection according to an exemplary embodiment of the present invention.

In an exemplary embodiment, the LS 64 may include a location method selection module 70. However this does not impose any limitation to the implementation of the location method selection module that could as well be included e.g., in the position determining entity 66. The location method selection module 70 may be any device or means embodied in hardware, software, or a combination of hardware and software that is capable of selecting one of a plurality of location methods based on predetermined selection criteria. FIG. 3 illustrates a control flow diagram of a method for self-learning location method selection according to an exemplary embodiment of the present invention. As shown in FIG. 3, the LCS client sends a request for location information 72 to the LS 64. Note that in other examples such request could be originated from the mobile terminal 10 itself. In such a situation, the mobile terminal 10 would act as a LCS client directly, or via an intermediate entity. In response to the request for location information 72, the location method selection module 70 determines which location method to employ in order to respond to the request for location information 72. The determination made by the location method selection module 70 is described in greater detail below. Following the determination of which location method to employ, the location method selection module 70 sends a message 74 to the position determining entity 66, directing the position determining entity 66 to use a specific location method determined by the location method selection module in order to obtain location information regarding a current position of the mobile terminal 10. The position determining entity 66 then employs the location method specified in the message 74 and communicates the location information to the LS 64 in a location estimation 76.

The location estimation 76 may include a confidence area estimate which specifies an estimated accuracy for the location information provided in the location estimation 76. In other words, the location estimation 76 may include the location information and accuracy information in the form of the confidence area estimate. For example, the location estimation 76 may express the location information as a coordinate location on an X-Y grid, such as latitude and longitude. Accordingly, the location estimation 76 may designate the accuracy information as an elliptical or other geometric shape defining an area for which there is a 67% confidence that the mobile terminal 10 is located within the elliptical or other geometric shape. In this example, the elliptical or other geometric shape and the percent-confidence value define the confidence area estimate. Alternatively, the location estimation 76 may define the location information regarding the mobile terminal 10 in terms of a particular position with a +/− distance value that establishes the confidence area estimate which inherently produces a circle shaped confidence area estimate.

It should be noted that the confidence area estimate may vary each time a location estimation 76 is provided. For example, a confidence area estimate for a cell ID based location method is often larger (i.e., less accurate) than a confidence area estimate for a GPS based location method. Furthermore, the confidence area estimate for the cell ID based location method and the GPS based location method may both vary in each different cell or geographical location due to issues such as cell size, signal strength, satellite positioning, etc. Accordingly, based on the cell, geographical location, and other factors, each location estimation 76 includes a confidence area estimate corresponding to the location method used.

In an exemplary embodiment, the location method selection module 70 may include a statistical database 80, which is updated based on each location estimation 76. In other words, the location method selection module 70 may record a confidence area estimate for each location estimation 76 along with an indication of the location method utilized to ascertain the location estimation, such that the location method selection module 70 is capable of determining an expected confidence area estimate (for example, an expected accuracy) associated with the location method used to provide the location estimation 76. Additionally, the location method selection module 70 may also associate some position information with the recordings of confidence area estimates. This could be in the form of coordinates or e.g. the serving cell identity, location area etc., thereby allowing the expected location accuracy to be determined for various areas, which is beneficial since the accuracy of a certain location method may depend on the area. For example, for each location method used, the location method selection module 70 may calculate an average or mean confidence area estimate based on the confidence area estimates associated with the most recent location estimation and all (or a predetermined number of the most recent) previous location estimations. Additionally, for example, a similar average or mean confidence area estimate may be calculated on a per area basis (e.g. per cell, suburb, city, etc.). Accordingly, when the request for location information 72 is received by the LS 64, the location method selection module 70 may use the confidence area estimate for each location method to determine which of the location methods is likely to meet the accuracy requirement, or requested location accuracy, of the QoS specification in the request for location information 72. If there is location information associated with confidence area estimates (or other accuracy indications), and the request for location information 72 has some initial indications of the location of the mobile terminal 10, the confidence area estimate relevant for this area can be used. For example, with the OMA standardized Secure User Plane Location (SUPL) solution, when the mobile terminal 10 acts as a LCS client requesting its own location, it can include the identity of the serving cell into the request. One of the location methods that is likely to meet the accuracy requirement may then be chosen, based upon further criteria described below, as the location method specified in the message 74. Thus, when the location estimation 76 is provided based on the location method specified in the message 74, the confidence area estimate associated with the location method used will be entered into the statistical database 80 to update the expected confidence area estimate for the location method used.

For example, if a request for location information 72 is received by the LS 64, and the QoS specification of the request for location information 72 specifies a desired accuracy of +/−300 m, the location method selection module 70 will access the statistical database to determine which location methods are associated with an expected confidence area estimate of no larger than +/−300 m. If, for example, the identity of the serving cell is included in the request, and the statistical database has entries for different cells, the expected confidence area corresponding to the serving cell can be used. Once the location method specified in the message 74 is communicated to the position determining entity 66 and the location estimation 76 is provided to the LS 64, the location method selection module 70 updates the expected confidence area estimate for the location method specified in the message 74. In this regard, the location method selection module 70 can adjust the average confidence area estimate based upon the confidence area estimate associated with the actual location estimation 76 that is provided to the LS 64. Alternatively, if the location method specified in the message 74 fails to produce the desired accuracy, notwithstanding the expected confidence area estimate, the location method selection module 70 may be directed to identify a second location method, if any, that also has an expected confidence area estimate that satisfies the desired accuracy such that the location determination can be repeated, albeit in accordance with the second location method, in order to determine the position with the desired accuracy.

As described above, the location method selection module 70 determines which location methods are associated with an expected confidence area estimate that at least meets the accuracy requirement specified in the request for location information 72. The location method that will be specified in the message 74 is then selected from among those location methods associated with an expected confidence area estimate that at least meets the accuracy requirement specified in the request for location information 72. In one embodiment, selection of the location method that will be specified in the message 74 is based on selection of one of the location methods associated with an expected confidence area estimate that at least meets the accuracy requirement specified in the request for location information 72 that uses a minimum of resources. In other embodiments, selection of the location method that will be specified in the message 74 is based on other considerations (i.e., other than minimization) of the amount of resources utilized by the location methods associated with an expected confidence area estimate that at least meets the accuracy requirement specified in the request for location information 72. For example, selection of the location method may be based upon the identification of a location method that both provides the desired accuracy and uses an amount of resources that meets a predefined resource usage criteria, such as the identification of a location method that uses less than a predefined amount of resources, regardless of whether the selected location method utilizes the minimum amount of resources. For purposes of illustration, but not of limitation, the selection of the location method will be described hereinafter in conjunction with the selection of a sufficiently accurate location method that utilizes the minimum amount of resources, although it is understood that other embodiments may select the location method based upon other considerations relating to the amount of resources utilized by the location method. In accordance with the illustrative embodiment, however, the location method that uses the least resources and yet is associated with an expected confidence area estimate that at least meets the accuracy requirement specified in the request for location information 72 will be selected and indicated to the position determining entity 66 as the location method specified in the message 74.

In order to determine the location method that uses the least resources and yet is associated with an expected confidence area estimate that at least meets the accuracy requirement specified in the request for location information 72, the location method selection module 70 may include a resource consumption table 82 which includes a resource consumption associated with each of the location methods. It should be noted that resource consumption is often constant for a particular location method. Thus, the resource consumption table 82 may store fixed values defining the resource consumption of each of the location methods. However, there are certain situations in which the resource consumption associated with a particular location method may change. For example, in a particular location, communication with GPS satellites may be difficult, at least during particular period(s) of time, leading to increased time requirements for communication and thus increasing the resource consumption associated with a GPS based location method. Accordingly, in an exemplary embodiment, the resource consumption table 82 may be updated periodically in a manner similar to that described above regarding the updating of expected confidence area estimates. Examples of possible parameters could be time, CPU loading or number of CPU cycles, memory, etc., used by a certain location method. In other words, for example, the location method selection module 70 may calculate an expected resource consumption following receipt of the location estimation 76 and the expected resource consumption for each location method may be used to determine which location method that uses the least resources and yet is associated with an expected confidence area estimate that at least meets the accuracy requirement specified in the request for location information 72 will be selected and indicated as the location method specified in the message 74. Additionally, the location method selection module 70 may also associate some position information with the information in the resource consumption table 82. This could again be in the form of coordinates or e.g. the serving cell identity, location area, etc.

Since the location method selection module 70 repeatedly updates the expected confidence area estimate associated with each location method, and is capable of determining a selected location method based on the accuracy requirement of a request for location information by selecting a location method that provides at least the accuracy requirement at a minimal resource consumption, the location method selection module 70 is referred to as being "self-learning".

Figure 4:
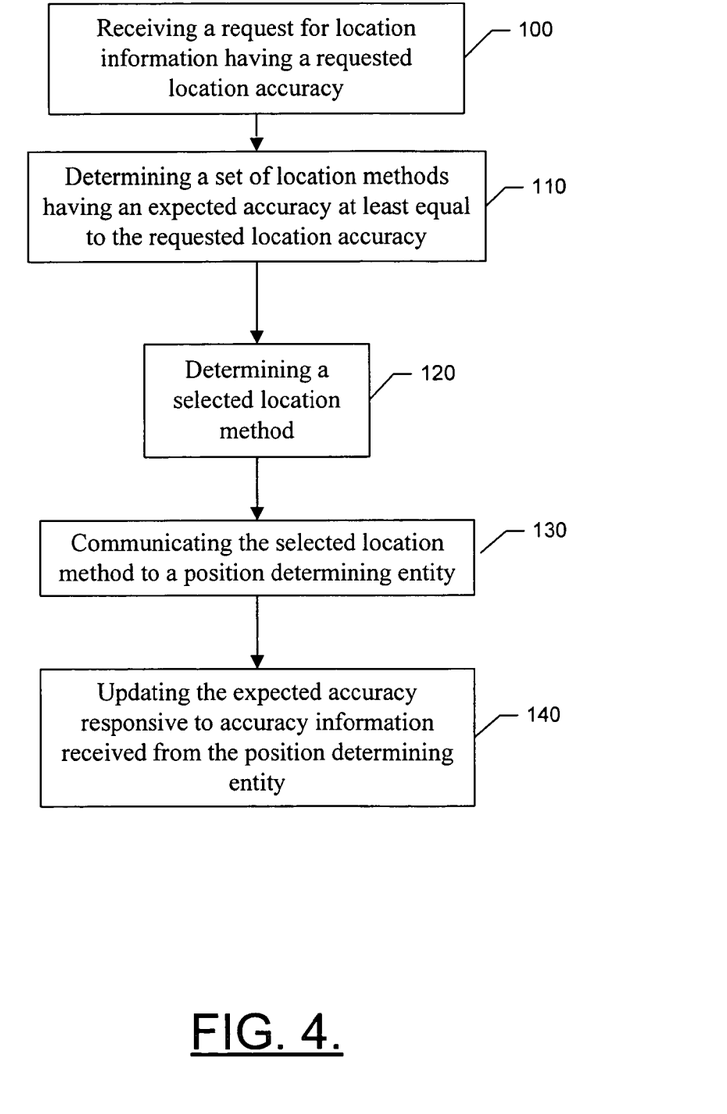
FIG. 4 is a block diagram according to an exemplary method of self-learning location method selection according to one embodiment of the present invention.

FIG. 4 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for location method selection includes receiving a request for location information at operation 100. The request for location information includes at least a requested location accuracy or there may be a default accuracy requirement associated with the request. At operation 110, a set of location methods having an expected accuracy at least equal to the requested location accuracy is determined. It should be noted that the set of location methods may be of any size, including one location method, if only one location method has an expected accuracy at least equal to the requested location accuracy. At operation 120, a selected location method is determined. For example, the selected location method may be the location method from among the set of location methods that has the lowest resource consumption. At operation 130, the selected location method is communicated to a position determining entity. At operation 140, the expected accuracy is updated responsive to accuracy information received from the position determining entity. The resource consumption for each location method in the set of location methods may be fixed or determined responsive to information gathered during each subsequent location method selection.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
 initiating the method by determining a selected location method from a set of location methods based on predetermined selection criteria;
 communicating the selected location method to a position determining entity, the selected location method to be used to determine location information of a mobile terminal;
 updating the predetermined selection criteria responsive to information received from the position determining entity, the information being descriptive of the predetermined selection criteria based at least on employment of the selected location method with respect to the determined location information, wherein the updating occurs prior to a re-initiation of the method; and
 determining a new selected location method from the set of location methods based on the updated predetermined selection criteria.

2. A method according to claim 1, further comprising an initial operation of receiving a request for location information, the request being associated with a requested location accuracy.

3. A method according to claim 2, further comprising determining the set of location methods from a plurality of location methods, the set of location methods including location methods having an expected accuracy at least equal to the requested location accuracy.

4. A method according to claim 1, wherein the predetermined selection criteria comprise an expected accuracy and a resource consumption, and wherein determining the selected location method comprises selecting the selected location method as one of the set of location methods having the expected accuracy at least equal to the requested location accuracy and a resource consumption that meets a predefined resource usage criteria.

5. A method according to claim 4, wherein updating the predetermined selection criteria comprises updating the expected accuracy based on accuracy information associated with the selected location method.

6. A method according to claim 5, wherein updating the predetermined selection criteria comprises associating information about a location of an event generating an update with the update.

7. A method according to claim 4, wherein updating the predetermined selection criteria comprises updating the resource consumption associated with the selected location method.

8. A method according to claim 7, wherein updating the predetermined selection criteria comprises associating information about a location of an event generating an update with the update.

9. A method according to claim 4, wherein determining the selected location method comprises using initial information regarding a location of the mobile terminal.

10. A method according to claim 9, wherein the initial information regarding the location of the mobile terminal includes an identity of a cell serving the mobile terminal.

11. A computer program product comprising at least one non-transitory computer-readable storage medium having computer-readable program code portions stored therein, the computer-readable program code portions comprising:
 a first executable portion for initiating the method by determining a selected location method from a set of location methods based on predetermined selection criteria;
 a second executable portion for communicating the selected location method to a position determining entity, the selected location method used to determine location information of a mobile terminal;
 a third executable portion for updating the predetermined selection criteria responsive to information received from the position determining entity, the information being descriptive of the predetermined selection criteria based at least on employment of the selected location method with respect to the determined location information, wherein the updating occurs prior to a re-initiation of the method; and
 a fourth executable portion for determining a new selected location method from the set of location methods based on the updated predetermined selection criteria.

12. A computer program product according to claim 11, further comprising a fifth executable portion for an initial operation of receiving a request for location information, the request being associated with a requested location accuracy.

13. A computer program product according to claim 12, further comprising a sixth executable portion for determining the set of location methods from a plurality of location methods, the set of location methods including location methods having an expected accuracy at least equal to the requested location accuracy.

14. A computer program product according to claim 11, wherein the predetermined selection criteria comprise an expected accuracy and a resource consumption, and the first executable portion includes instructions for selecting the selected location method as one of the set of location methods having the expected accuracy at least equal to the requested location accuracy and a resource consumption that meets a predefined resource usage criteria.

15. A computer program product according to claim 14, wherein the third executable portion includes instructions for updating the expected accuracy based on accuracy information associated with the selected location method.

16. A computer program product according to claim 14, wherein the third executable portion includes instructions for updating the resource consumption associated with the selected location method.

17. An apparatus comprising a processor configured to control a location method selection module, wherein the location method selection module is configured to:
 initiate a process by determining a selected location method from a set of location methods based on predetermined selection criteria;
 communicate the selected location method to a position determining entity, the selected location method to be used to determine location information of a mobile terminal;
 update the predetermined selection criteria responsive to information received from the position determining entity, the information being descriptive of the predetermined selection criteria based at least on employment of the selected location method with respect to the determined location information, wherein the updating occurs prior to a re-initiation of the process; and determine a new selected location method from the set of location methods based on the updated predetermined selection criteria.

18. An apparatus according to claim 17, wherein the location method selection module is further configured to receive a request for location information, the request being associated with a requested location accuracy.

19. An apparatus according to claim 18, wherein the location method selection module is further configured to determine the set of location methods from a plurality of location methods, the set of location methods including location methods having an expected accuracy at least equal to the requested location accuracy.

20. An apparatus according to claim 17, wherein the location method selection module is in communication with a statistical database and a resource consumption table.

21. An apparatus according to claim 20, wherein the statistical database includes a list of each of the plurality of location methods and the expected accuracy associated with each of the plurality of location methods.

22. An apparatus according to claim 20, wherein the statistical database includes a list of each of the plurality of location methods and an expected accuracy associated with each of the plurality of location methods, and the resource consumption table includes the list of each of the plurality of location methods and a resource consumption associated with each of the plurality of location methods.

23. An apparatus according to claim 22, wherein the predetermined selection criteria comprise the expected accuracy and the resource consumption, and wherein the selected location method is determined by selection of one of the set of location methods having the expected accuracy at least equal to a requested location accuracy and a resource consumption that meets a predefined resource usage criteria.

24. An apparatus according to claim 23, wherein the update of the predetermined selection criteria comprises an update of the expected accuracy based on accuracy information associated with the selected location method.

25. An apparatus according to claim 23, wherein the update of the predetermined selection criteria comprises an update of the resource consumption associated with the selected location method.

26. An apparatus according to claim 17, wherein the apparatus is a location server in a wireless communication network.

27. An apparatus in accordance with claim 26, wherein the position determining entity is co-located with the location server.

28. An apparatus comprising:

a statistical database;

a resource consumption table; and a means for selecting a location method in communication with both the statistical database and the resource consumption table wherein the means for selecting the location method is configured to:

initiate a process by determining a selected location method from a set of location methods based on predetermined selection criteria;

communicate the selected location method to a position determining entity, the selected location method used to determine location information of a mobile terminal; and update the predetermined selection criteria responsive to information received from the position determining entity, the information being descriptive of the predetermined selection criteria based at least on employment of the selected location method with respect to the determined location information, wherein the updating occurs prior to a re-initiation of the process; and determine a new selected location method from the set of location methods based on the updated predetermined selection criteria.

29. An apparatus according to claim 28, wherein the means for selecting the location method is further configured to receive a request for location information, the request being associated with a requested location accuracy.

* * * * *